United States Patent
Sasaki et al.

[11] Patent Number: 5,357,723
[45] Date of Patent: Oct. 25, 1994

[54] VIBRATION DAMPING DEVICE

[75] Inventors: Teruo Sasaki; Kazuhiro Fujisawa, both of Kobe; Akemi Kawanabe; Seinosuke Kato, both of Nishinomiya, all of Japan

[73] Assignee: Sumitomo Rubber Industries, Ltd, Hyogo, Japan

[21] Appl. No.: 86,025

[22] Filed: Jul. 6, 1993

[30] Foreign Application Priority Data

Aug. 4, 1992 [JP] Japan .................................. 4-206889

[51] Int. Cl.$^5$ .............................................. E04B 1/98
[52] U.S. Cl. ............................ 52/167 RS; 52/167 RM
[58] Field of Search ............ 52/167, 167 RS, 167 RA, 52/167 E, 167 EA, 167 T, 167 RM; 248/638; 384/494, 571, 572, 562, 585

[56] References Cited

U.S. PATENT DOCUMENTS

| | | | |
|---|---|---|---|
| 2,002,934 | 5/1935 | Collins | 52/167 R |
| 4,006,505 | 2/1977 | Koster et al. | 52/167 R X |
| 4,333,695 | 6/1982 | Evans | 384/562 |
| 4,523,862 | 6/1985 | Yasui et al. | 384/572 X |
| 4,527,365 | 7/1985 | Yoshizawa et al. | 52/167 R |
| 4,593,501 | 6/1986 | Delfusse | 52/167 R |
| 4,593,502 | 6/1986 | Buckle | 52/167 |
| 4,707,152 | 11/1987 | Neese | 384/572 |
| 4,805,359 | 2/1989 | Miyake et al. | 52/107 |
| 4,991,366 | 2/1991 | Teramura et al. | 52/167 R |

Primary Examiner—Carl D. Friedman
Assistant Examiner—Creighton Smith
Attorney, Agent, or Firm—Nikaido, Marmelstein, Murray & Oram

[57] ABSTRACT

This invention is intended to provide a vibration damping device having a high degree of freedom of design of damping performance. This device includes rolling bodies (4) interposed between an upper structure (1) and a lower structure (2) to horizontally swingably support the upper structure (1) and elastomeric members (5) disposed between the rolling bodies (4) and the upper and lower structures (1, 2). In this device, rolling surfaces for the rolling bodies (4) are formed by elastomeric members (5) and rigid members (6). For example, the elastomeric and rigid members (5, 6) are disposed respectively in association with the opposite end regions and central regions of the rolling bodies (4). The elastomeric members (5) may be made of any desired material provided that it has viscoelasticty and the rigid member 6 may be made of any desired material provided that the rolling friction of the rolling bodies (4) thereon differs from that on the elastomeric members (5). For example, metal, ceramic material, rigid plastic material, FRP, FRM, and PTFE are preferable.

7 Claims, 6 Drawing Sheets

VIBRATION DAMPING DEVICE

BACKGROUND OF THE INVENTION

1. Field of the Invention

The present invention relates to a vibration damping device and more particularly it relates to a vibration damping device adapted to consume kinetic energy produced when a building or apparatus is moved by a vibration input, such as earthquakes, winds, traffic vibrations or mechanical vibrations, attended by an energy loss which means attainment of absorption and suppression of the vibrations in such building or apparatus.

2. Related Art

In the case of protecting buildings or apparatuses from various vibrations such as earthquakes, winds, traffic vibrations and mechanical vibrations, various types of vibration suppressing devices, such as earthquake proofing devices, are used. For example, an earthquake proofing device protects a building or apparatus when a vibration occurs by imparting a resonance frequency sufficiently higher than the input frequency. In this case, it has been common practice to use a vibration damping device, such as an oil damper, friction damper or hysteresis damper, as well.

Besides being used together with said earthquake proofing devices, such vibration damping devices, including oil dampers, friction dampers and hysteresis dampers, are singly used as vibration suppressing devices to absorb kinetic energy due to various vibrations, such as earthquakes, winds, traffic vibrations and mechanical vibrations.

The present applicant previously proposed a vibration suppressing device disclosed in Japanese Patent Application Publication (Kokat) No. Hei 3-217533. This device comprises a plurality of rolling bodies interposed between an upper structure and a lower structure to horizontally swingably support said upper structure, rolling surfaces for said rolling bodies having elastomeric members disposed thereon, the arrangement being such that the rolling of said rolling bodies absorbs the horizontal component of vibration energy while the local elastic deformation of the elastomeric members forming the rolling surfaces absorb the vertical component of vibration energy.

In this connection it is to be noted that a vibration damping device used as a vibration suppressing device has to be designed to develop the desired damping characteristics associated with the manner of use, and in this respect the vibration suppressing device disclosed in Japanese Patent Application Publication No. Hei 3-217533 is adapted to change its damping performance by changing the kind of material or thickness of the elastomeric members, supported load or the diameter of the rolling bodies.

Even if the kind of material or thickness of the elastomeric members, supported load or the diameter of the rolling bodies is changed, however, it is difficult to change the damping performance to a great degree and the degree of freedom of design of damping performance is low, making it difficult to attain the proper manner of use.

SUMMARY OF THE INVENTION

Accordingly, the present invention has been proposed with the above problems in mind, and is intended to provide a vibration damping device having a high degree of freedom of design of damping performance.

As technical means for solving said problems, the present invention provides a vibration damping device wherein rolling bodies are interposed between an upper structure and a lower structure to horizontally swingably support said upper structure and elastomeric members are disposed between said rolling bodies and said upper and lower structures, said device being characterized in that rolling surfaces for said rolling bodies are formed by elastomeric members and rigid members.

Further, in this vibration damping device, it is desirable that the elastomeric members project beyond the rigid members.

In the vibration damping device of the present invention, the formation of the rolling surfaces for the rolling bodies by elastomeric and rigid members results in the rolling friction of the rolling bodies on the elastomeric members being different from the rolling friction of the rolling bodies on the rigid members; thus, the damping performance can be changed to a great degree by changing the area proportions of the elastomeric and rigid members on the rolling surfaces.

By disposing the elastomeric members to project beyond the rigid members and changing the amount of projection, the damping performance can be greatly changed.

The damping performance is developed by the rolling friction of the rolling bodies and the adhesion between the rolling bodies and the rolling surfaces.

BRIEF DESCRIPTION OF THE DRAWINGS

FIG. 15 is a front view showing a vibration damping device according to the invention utilized as a vibration suppressing device for decreasing vibrations in a building or the like.

DESCRIPTION OF THE PREFERRED EMBODIMENTS

Vibration damping devices according to embodiments of the present invention will now be described with reference to FIGS. 1 through 15.

Figure 1:
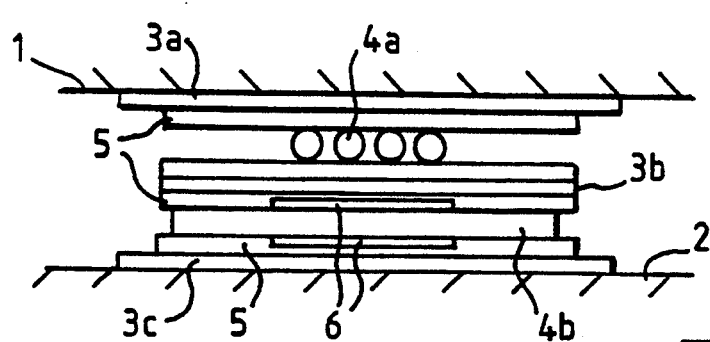
FIG. 1 is a front view showing the whole of a vibration damping device according to a first embodiment of the present invention.
Figure 2:
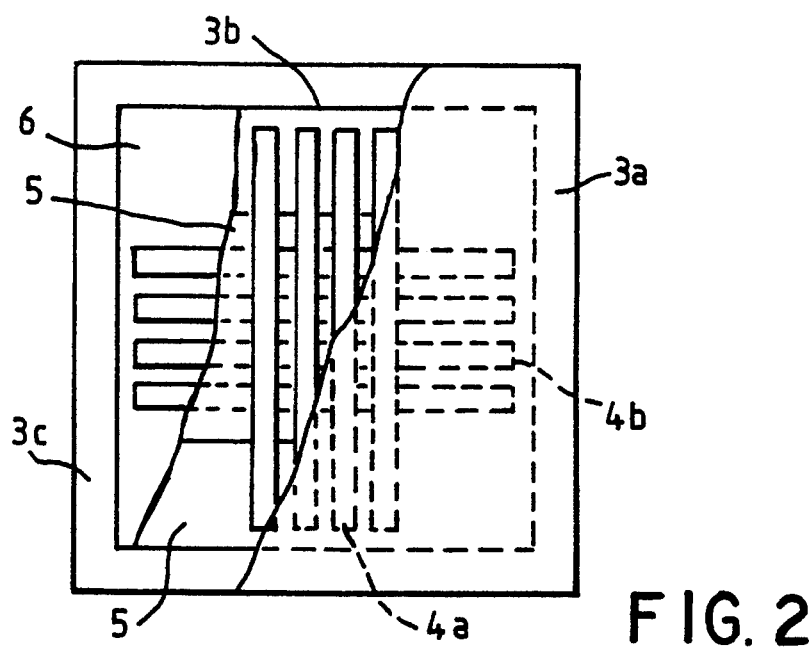
FIG. 2 is a plan view, partly broken away, of FIG. 1.
Figure 3:
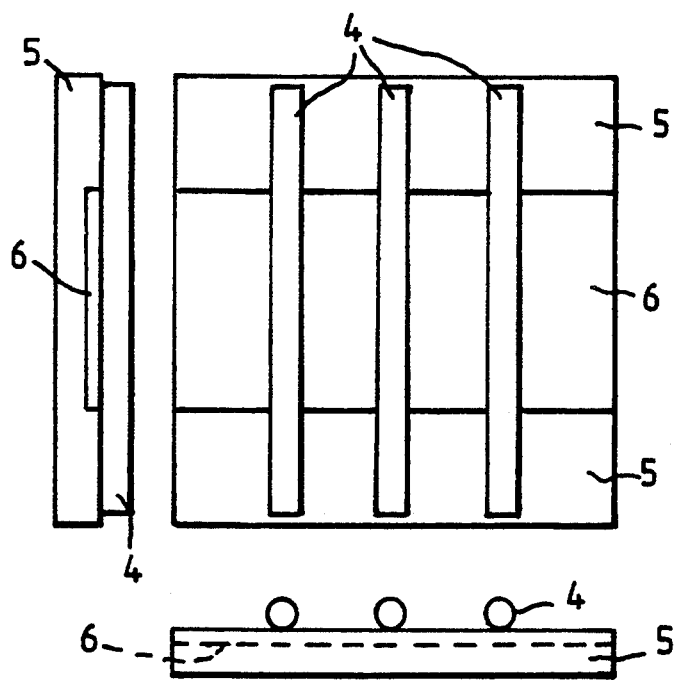
FIG. 3 is a plan view, front view and side view, showing the concrete arrangement of the first embodiment.

FIGS. 1 and 2 show a vibration damping device according to a first embodiment, and FIG. 3 shows rolling bodies and the rolling surface of a pressure-resistant plate (not shown) disposed thereunder.

The first embodiment shown in FIGS. 1 and 2 has rolling bodies stacked in two stages. The numeral 1 denotes an upper structure, such as a building, an apparatus, e.g., a computer, or a floor for supporting such apparatus; 2 denotes a lower structure such as a foundation; 3a denotes an upper pressure-resistant plate, such as a steel plate, fixed on the lower surface of the upper structure 1; 3c denotes a lower pressure-resistant plate such as a steel plate fixed on the upper surface of the lower structure 2 in opposed relation to the upper pressure-resistant plate 3a; 3b denotes an intermediate pressure-resistant plate disposed between the upper and lower pressure-resistant plates 3a and 3c; 4a and 4b denote upper and lower rolling bodies interposed parallel between the intermediate and lower pressure-resistant plates 3b and 3c, said upper and lower rolling bodies 4a and 4b being disposed in two stages, forming an angle of 90 degrees with respect to each other. In addition, the material of the upper and lower rolling bodies 4a and 4b is such that it can endure vertical loads on the upper structure; for example, metal, concrete, ceramic material, rigid plastic material, FRP or the like.

The features of the present invention reside in the rolling surfaces of the upper, intermediate and lower pressure-resistant plates 3a, 3b and 3c for the rolling bodies 4a and 4b. The rolling surfaces of the pressure-resistant plates (not shown in FIG. 3) (the upper, intermediate and lower pressure-resistant plates 3a, 3b, and 3c in FIGS. 1 and 2) for the rolling bodies 4 shown in FIG. 3 (the upper and lower rolling bodies 4a and 4b in FIGS. 1 and 2) will now be described in detail.

The rolling surfaces of the pressure-resistant plates are formed by elastomeric members 5 and rigid members 6. In this first embodiment, the elastomeric members 5 are disposed in association with the opposite end regions of the rolling bodies 4 and rigid members 6 are disposed in association with the central regions thereof. The elastomeric members may be made of any desired material provided that it has viscoelasticity; for example, rubber or plastic material may be used, and the rigid members 6 may be made of any desired material provided that the rolling friction of the rolling bodies 4 on it differs from that on the elastomeric material 5; for example, metal, ceramic material, rigid plastic material, FRP, FRM, and PTFE are desirable. Further, the elastomeric and rigid members 5 and 6 may respectively be made of a combination of different materials.

Figure 4:
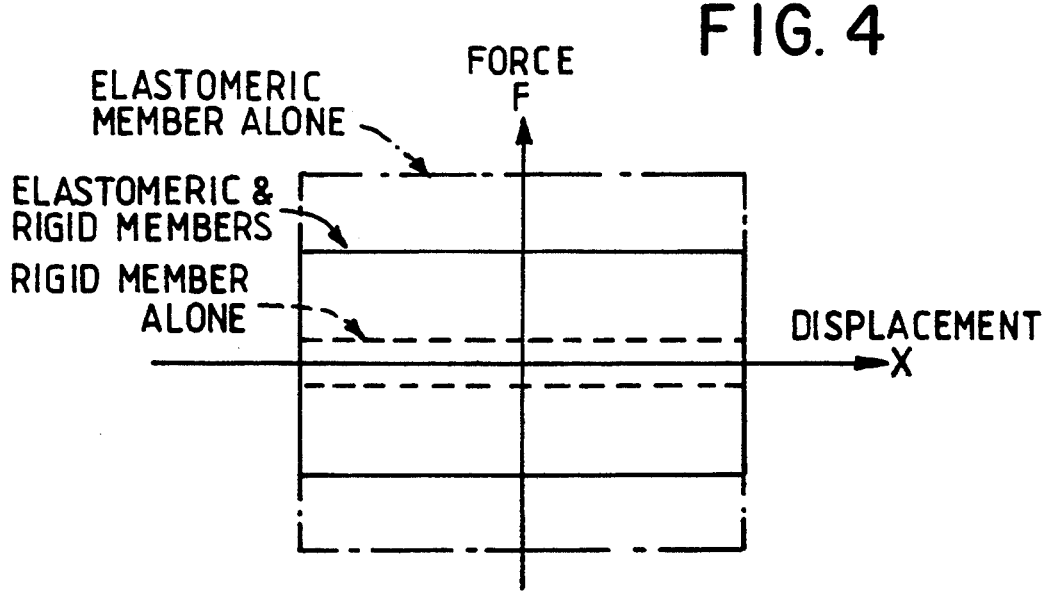
FIG. 4 is s characteristic graph showing the damping performance of the first embodiment.

During rolling of the rolling bodies 4 on said rolling surfaces, the rolling friction of the rolling bodies 4 on the elastomeric members 5 differs from the rolling friction of the rolling bodies 4 on the rigid members 6. FIG. 4 shows the damping characteristic in the first embodiment. In the figure, the solid line indicates the case of using the elastomeric and rigid members 5 and 6 to form the rolling surface, the broken line indicates the case of using the rigid member 6 alone, and the dash-dot line indicates the use of the elastomeric member 5 alone. By changing the area proportions of the rigid and elastomeric members 6 and 5 on the rolling surfaces in this manner, the damping performance can be freely designed within the range between the damping performance for the rigid member alone (broken line) and that for the elastomeric member alone (dash-dot line).

In addition, said rigid member 6 is formed only on the top layer of the rolling surface, with the elastomeric member 5 disposed under said rigid member 6; thus, there is no danger of losing the vertical vibration damping performance. The same may be said of embodiments to be described below.

Figure 5:
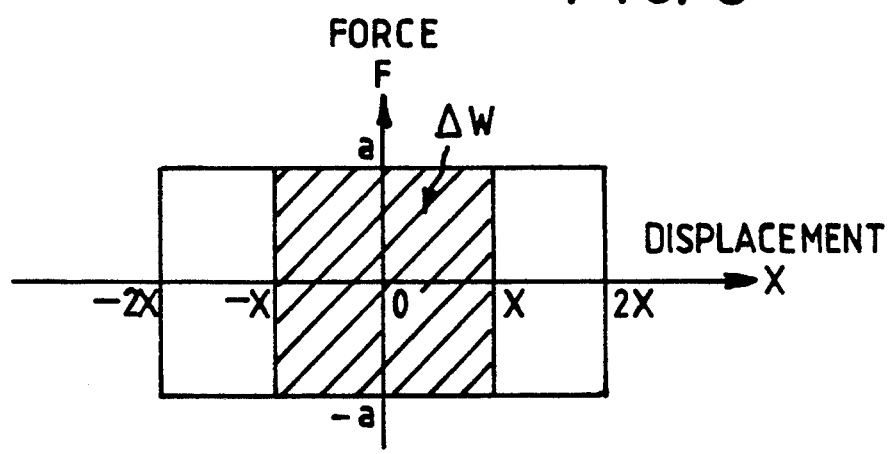
FIG. 5 is a characteristic graph showing the damping performance of a vibration damping device utilizing friction damping.
Figure 6:
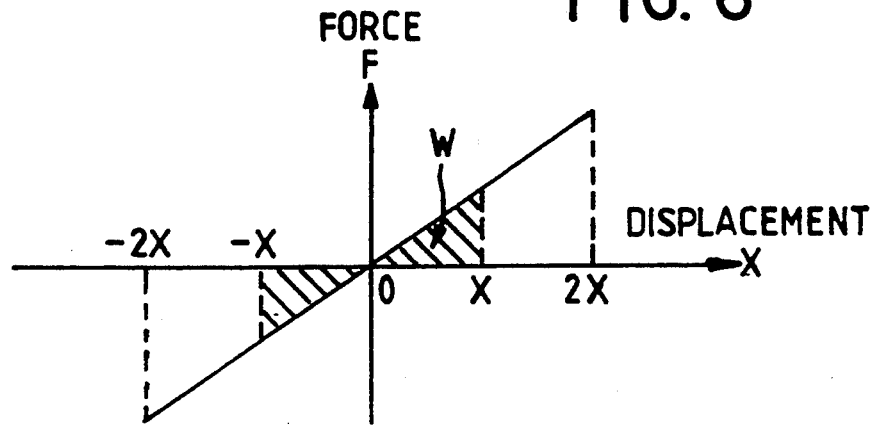
FIG. 6 is a characteristic graph showing the spring of a vibration damping device.
Figure 7:
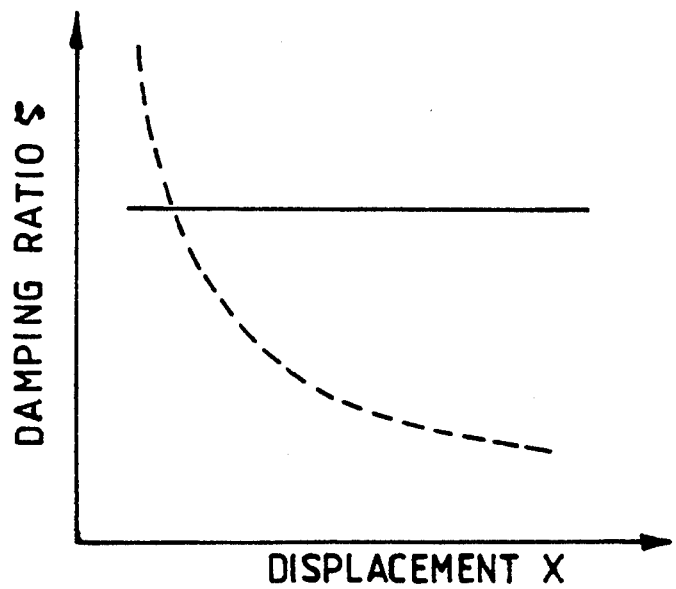
FIG. 7 is a characteristic graph showing the damping performance of a vibration suppressing device having the characteristics shown in FIGS. 5 and 6.

Generally, a vibration damping device utilizing friction damping has a damping characteristic shown in FIG. 5. In the case where a vibration damping device having such damping characteristic and a vibration suppressing device using a spring having a characteristic shown in FIG. 6 are fabricated, the damping ratio of the vibration suppressing device is inversely proportional to the displacement X, as shown in the broken line in FIG. 7. In addition, a linear spring having the characteristic shown in FIG. 6 is recommended as said spring since it is easy to handle.

When the vibration suppressing device is moved through a displacement of ± x, the loss energy $\Delta W$ is indicated by the shaded area in FIG. 5 and the elastic energy W is indicated by the shaded area in FIG. 6. Let a be the rolling friction force (see FIG. 5) and k (the inclination of the straight line in FIG. 6) be the spring constant. Then, the loss energy $\Delta W = 2aX$, elastic energy $W = kX^2$, and damping ratio $\xi = (\Delta W/W)/(2\pi) = (2a/k)/(2\pi)/X$, from which equation it is seen that the damping ratio $\xi$ is inversely proportional to the displacement X.

With the vibration suppressing device described above, however, since the damping ratio is inversely proportional to the displacement, there is a problem that the damping performance is decreased when a great deformation occurs. Thus, if it is desired to ensure that the damping ratio $\xi$ is constant with respect to the displacement X, as shown in solid line in FIG. 7, this can be attained only if the damping performance can be set so that the loss energy $\Delta W$ is proportional to the second power of the displacement X.

Figure 8:
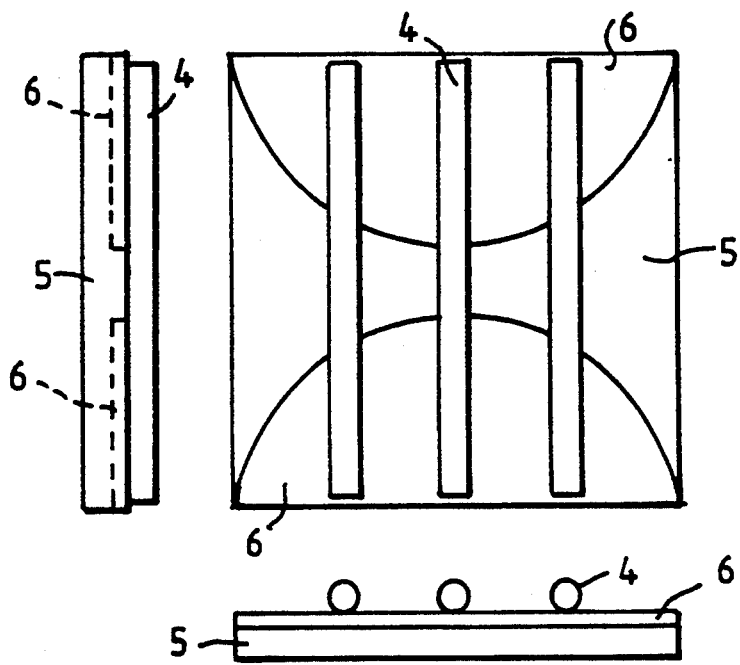
FIG. 8 is a plan view, front view and side view, showing a second embodiment.
Figure 9:
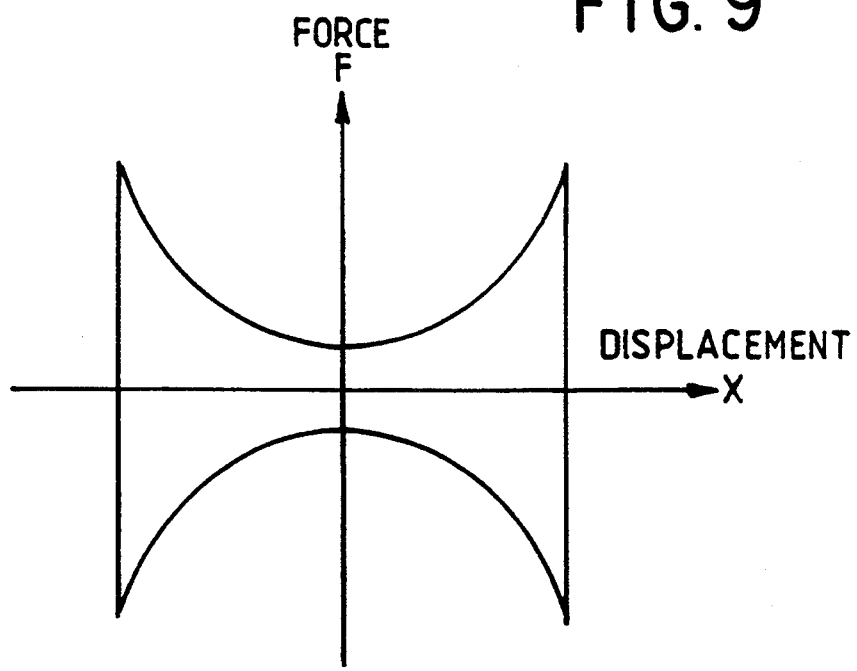
FIG. 9 is a characteristic graph showing the damping performance of the second embodiment.

A second embodiment intended to solve this problems is shown in FIG. 8. Whereas in the first embodiment of FIG. 3 during the rolling of the rolling bodies, the area proportions of the rigid and elastomeric members 6 and 5 remain constant even if the displacement increases, the second embodiment is designed so that as the displacement X increases, the area proportions of the rigid and elastomeric members 6 and 5 change so as to increase the proportion of the elastomeric members 5. The damping performance in the second embodiment is such that as shown in FIG. 9, as the displacement X increases, the rolling friction of the rolling bodies 4 increases, increasing the damping performance. If the area proportions of the rigid and elastomeric members 6 and 5 are changed relative to the displacement so as to make the loss energy $\Delta W$ proportional to the second power of the displacement X, then a vibration suppressing device can be obtained in which the damping ratio is constant with respect to the displacement X.

Figure 10:
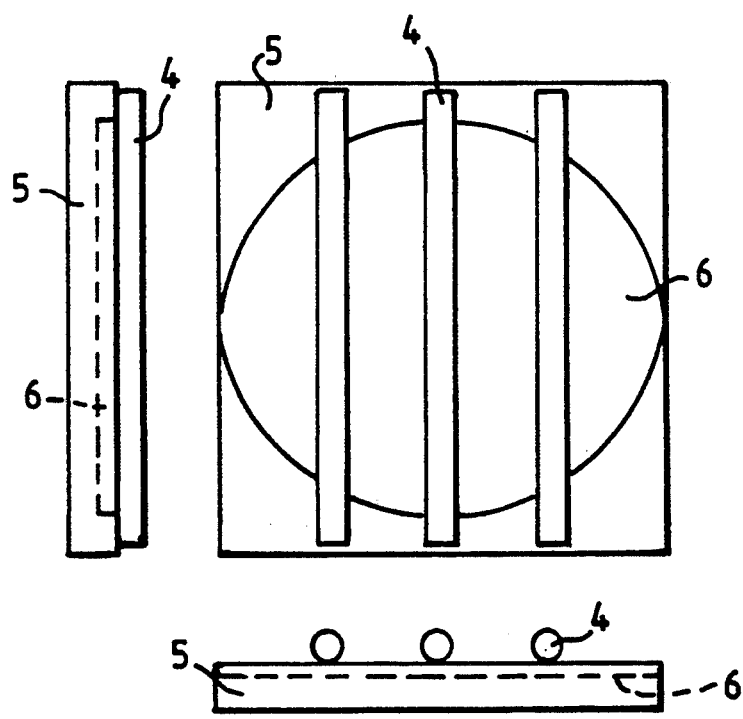
FIG. 10 is a plan view, front view and side view, showing a third embodiment.

A third embodiment similar to the second embodiment is shown in FIG. 10. This third embodiment, like the second one, is designed so that as the displacement increases, the area proportions of the rigid and elastomeric members 6 and 5 are designed to increase the proportion of the elastomeric members 5. Therefore, if the change in the area proportions of the elastomeric and rigid members 5 and 6 is the same as in the case of the second embodiment irrespective of the plane figures of the elastomeric and rigid members 5 and 6, then the damping performance obtained is as shown in FIG. 9, as in the second embodiment.

Figure 11:
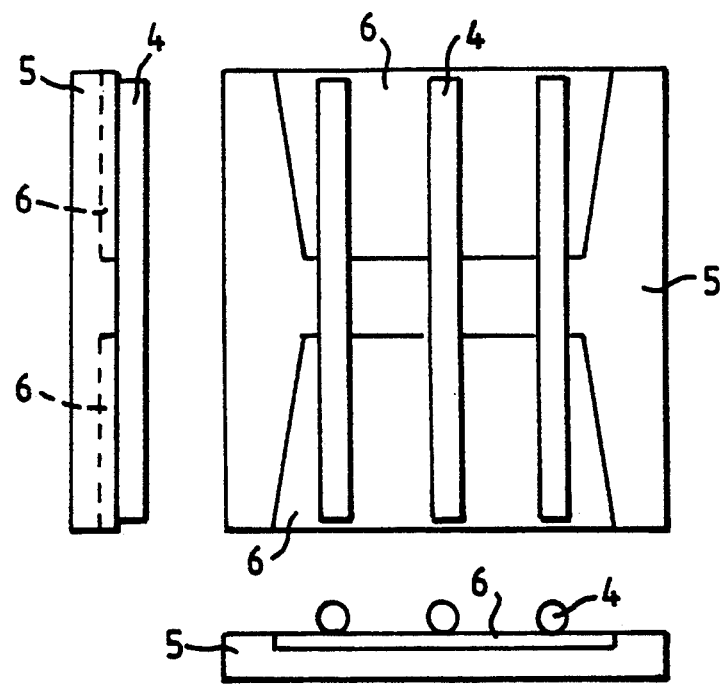
FIG. 11 is a plan view, front view and side view, showing a fourth embodiment.

FIG. 11 shows a fourth embodiment arranged so that with the plane figures of the elastomeric and rigid members 5 and 6 as shown, the area proportions of the elastomeric and rigid members 5 and 6 are designed so that as the displacement increases, the proportion of the elastomeric members 5 sharply increases in the great displacement region, whereby the rolling friction force sharply increases during great displacement, and the damping performance sharply increases.

Figure 12:
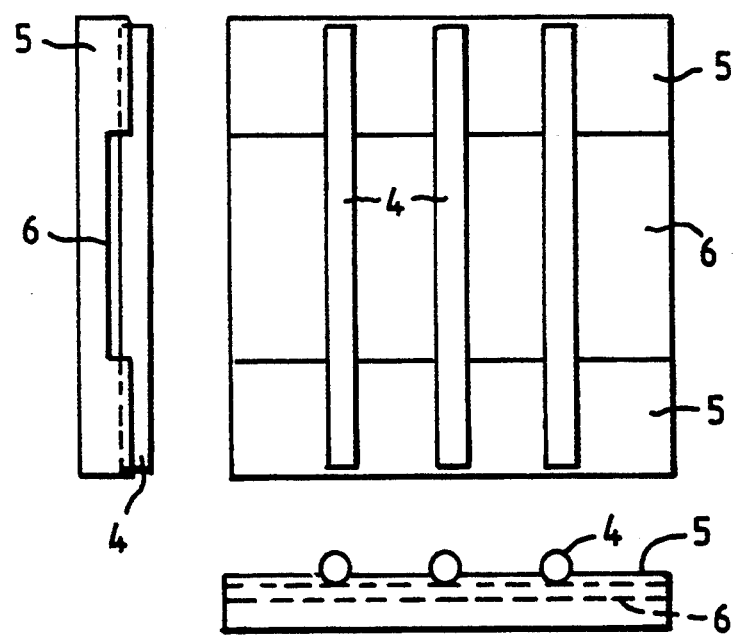
FIG. 12 is a plan view, front view and side view, showing a fifth embodiment.
Figure 13:
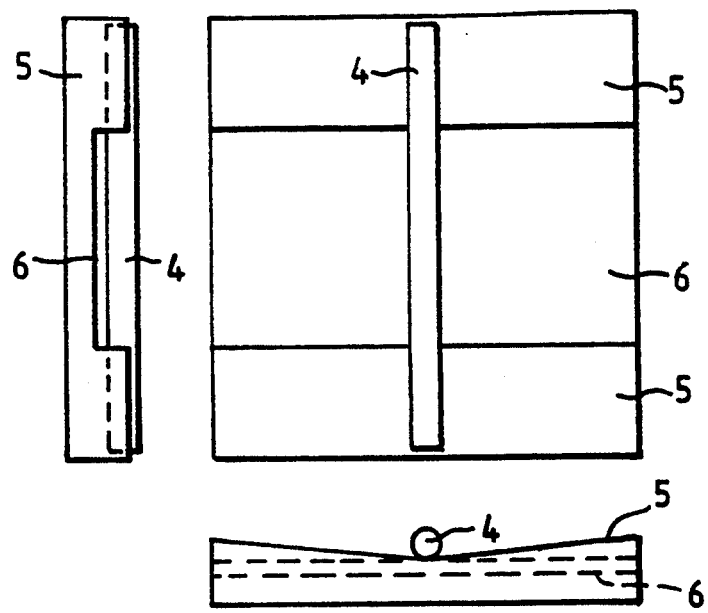
FIG. 13 is a plan view, front view and side view, showing a sixth embodiment.
Figure 14:
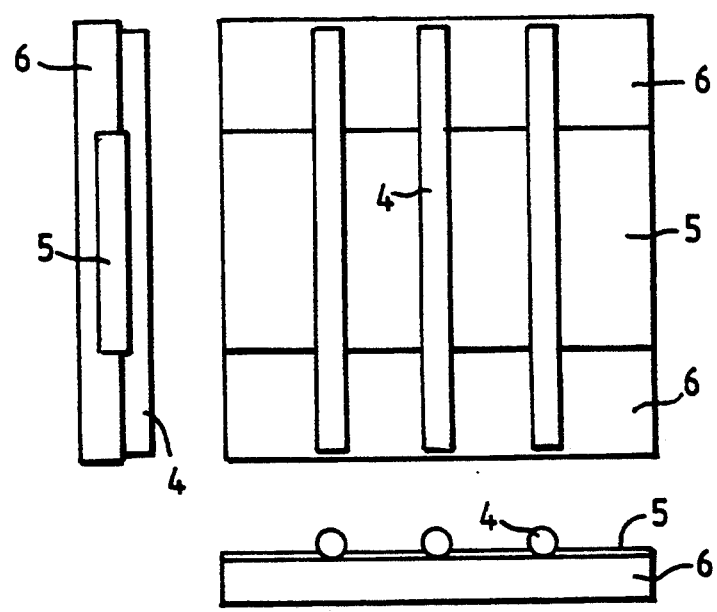
FIG. 14 is a plan view, front view and side view, showing a seventh embodiment.

Fifth and sixth embodiments of the present invention are shown in FIGS. 12 and 13. In the fifth embodiment, which is a modification of the first embodiment, unlike the first through fourth embodiments described above (in which the elastomeric and rigid members 5 and 6 are flush with each other), the elastomeric members 5 project beyond the rigid members. As a result of such projection of the elastomeric members 5, local elastic deformation of the elastomeric members 5 due to the rolling of the rolling bodies 4 makes it possible to change the rolling friction force, unlike the case of the first embodiment. In this case, the rolling friction force is higher than in the case of the first embodiment. The sixth embodiment is arranged so that the rolling friction force can be changed by changing the amount of projection of the elastomeric members 5 according to the displacement. In this case, as compared with the fifth embodiment, the amount of projection of the elastomeric members 5 is increased as the displacement increases. Therefore, the characteristic obtained is such that when the displacement increases as shown in FIG. 9, the rolling friction force increases, and the damping performance increases.

In addition, an arrangement opposite to the fifth embodiment may be made by exchanging the positions of the elastomeric and rigid members 5 and 6. For example, as in a seventh embodiment shown in FIG. 14, the elastomeric member 5 and rigid members 6 may be disposed respectively in association with the central regions and opposite end regions of the rolling bodies 4 and, as shown, the rigid members 6 project beyond the elastomeric member 5. In this case, a vibration damping device hardly liable to develop creep can be provided by selecting a material less liable to develop creep for the rigid members 6 than the material of the elastomeric member 5.

Further, the rolling surfaces positioned above and below the rolling bodies may be made in different forms by combining the first through seventh embodiments described above.

The first through seventh embodiments described above are examples only, and the present invention is not limited thereto; any desired forms may be made which allow the area proportions of the elastomeric and rigid members 5 and 6 to be changed.

Figure 15:
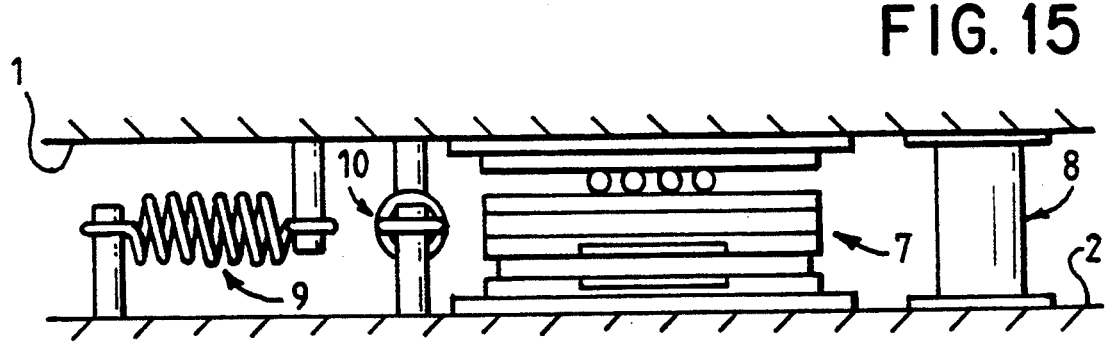

When it is desired to utilize a vibration damping device according to the present invention as a vibration suppressing device for decreasing vibrations in a building or the like, as shown in FIG. 15, the vibration damping device 7 of the invention (in the figure, the first embodiment shown in FIG. 1 is used) will be supplemented with restoring elastic bodies 8, 9 and 10 interposed between the upper and lower structures 1 and 2 for restoring the upper structure 1 to its original position after it has been horizontally moved as by an earthquake. As such restoring elastic bodies, use may be made of a rubber-like elastic body or metal springs 9 and 10 disposed orthogonal to each other. Further, these restoring elastic bodies 8, 9 and 10 may be used singly or in combination.

The present invention resides in forming the rolling surfaces for the rolling bodies by elastomeric and rigid members, changing the area proportions of the elastomeric and rigid members in the rolling surfaces, and disposing said elastomeric members to project beyond the rigid members, thereby making it possible to greatly change the damping performance. Thus, the invention provides a vibration damping device which is simple in construction and which has a high degree of freedom of design of damping performance; thus, the practical value of the invention is high.

What is claimed is:

1. A vibration damping device comprising:
    an upper structure;
    a lower structure;
    rolling bodies interposed between said upper structure and said lower structure to horizontally swingably support said upper structure;
    rigid members; and
    elastomeric members are disposed between said rolling bodies and said upper and lower structures,
    wherein rolling surfaces are formed by said elastomeric members and said rigid members for said rolling bodies.

2. A vibration damping device as set forth in claim 1, wherein area proportions of the elastomeric members and rigid members forming the rolling surfaces change in a rolling direction of the rolling bodies.

3. A vibration damping device as set forth in claim 2, wherein the area proportion of the elastomeric members increases as a distance increases from a central region in the rolling direction of the rolling bodies in the rolling surfaces.

4. A vibration damping device as set forth in claim 2, wherein the area proportion of the elastomeric members sharply increases in a large-displacement region.

5. A vibration damping device as set forth in claim 1, wherein the elastomeric members project beyond the rigid members in the rolling surfaces.

6. A vibration damping device as set forth in claim 5, wherein an amount of projection of the elastomeric members changes in a rolling direction of the rolling bodies.

7. A vibration damping device as set forth in claim 6, wherein the amount of projection of the elastomeric members increases as a distance increases from a central region in the rolling direction of the rolling bodies in the rolling surfaces.

* * * * *